(12) United States Patent
Luo et al.

(10) Patent No.: US 12,276,547 B2
(45) Date of Patent: Apr. 15, 2025

(54) WIDE-FIELD IMAGING AND HYPERSPECTRAL COLLABORATIVE EARLY WARNING SYSTEM AND METHOD

(71) Applicant: HEFEI INSTITUTES OF PHYSICAL SCIENCE, CHINESE ACADEMY OF SCIENCES, Hefei (CN)

(72) Inventors: Haiyan Luo, Hefei (CN); Wei Xiong, Hefei (CN); Zhiwei Li, Hefei (CN); Wei Jin, Hefei (CN); Dekang Wang, Hefei (CN); Qiansheng Wang, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 193 days.

(21) Appl. No.: 18/022,276

(22) PCT Filed: Jul. 4, 2022

(86) PCT No.: PCT/CN2022/103591
§ 371 (c)(1),
(2) Date: Feb. 21, 2023

(87) PCT Pub. No.: WO2023/005616
PCT Pub. Date: Feb. 2, 2023

(65) Prior Publication Data
US 2023/0324225 A1    Oct. 12, 2023

(30) Foreign Application Priority Data

Jul. 28, 2021   (CN) .......................... 202110856503.9

(51) Int. Cl.
*G01J 3/12*    (2006.01)
*G01J 3/28*    (2006.01)
*G01J 3/45*    (2006.01)

(52) U.S. Cl.
CPC ............... *G01J 3/12* (2013.01); *G01J 3/2823* (2013.01); *G01J 3/45* (2013.01)

(58) Field of Classification Search
CPC .......... G01J 3/45; G01J 3/0229; G01J 3/2823; G01J 3/12; G01J 3/0205; G01J 3/2833; G01N 21/27; Y02A 40/10
See application file for complete search history.

(56) References Cited

U.S. PATENT DOCUMENTS 5,612,736 A * 3/1997 Vogeley ................ G06F 3/0421
348/E5.142
5,796,508 A * 8/1998 Suzuki ..................... B41J 2/465
359/872

(Continued)

FOREIGN PATENT DOCUMENTS

CN         103925999 A      7/2014
CN         105043544 A      11/2015
(Continued)

*Primary Examiner* — Sang H Nguyen
(74) *Attorney, Agent, or Firm* — Bayramoglu Law Offices LLC

(57) ABSTRACT

A wide-field imaging and hyperspectral collaborative early warning system and method are provided. The system includes: a primary imaging system, a digital micromirror array, a first collimation system, a second collimation system, a first reflector, a second reflector, a wide-field imaging optical filter, a narrow-band optical filter, a wide-field imager and a hyperspectral interferometer. The system and method have the advantages that the wide-field imaging general survey and fine spectrum detection can be realized synchronously, the functions are multiple, and the false alarm rate is low; the target spatial resolution of the fine spectrum identification is adjustable, the micro-control unit flipping solution is simple to operate, and quick adjustment is realized; the adaptability is strong, the flipping time of the corresponding micro-control unit is adaptively adjusted for (Continued)

the measured target with too low or too strong radiation intensity, and the dynamic range of the system is effectively improved.

11 Claims, 5 Drawing Sheets

(56) References Cited

U.S. PATENT DOCUMENTS

| | | | |
|---|---|---|---|
| 8,810,650 | B1 | 8/2014 | Neumann et al. |
| 2003/0095307 | A1* | 5/2003 | Moon ................ G02B 6/29395 359/291 |
| 2005/0270528 | A1* | 12/2005 | Geshwind .............. G06V 20/13 356/330 |
| 2015/0156477 | A1* | 6/2015 | Lee ...................... H04N 13/254 348/46 |
| 2017/0176338 | A1* | 6/2017 | Wu .................... G01N 21/6428 |
| 2019/0107698 | A1* | 4/2019 | Jovin ................. G02B 21/0048 |
| 2019/0353887 | A1* | 11/2019 | Riza .................... G02B 21/367 |
| 2020/0003893 | A1* | 1/2020 | Okada ...................... G02F 1/29 |

FOREIGN PATENT DOCUMENTS

| | | |
|---|---|---|
| CN | 106932094 A | 7/2017 |
| CN | 110887564 A | 3/2020 |
| CN | 113588081 A | 11/2021 |

* cited by examiner

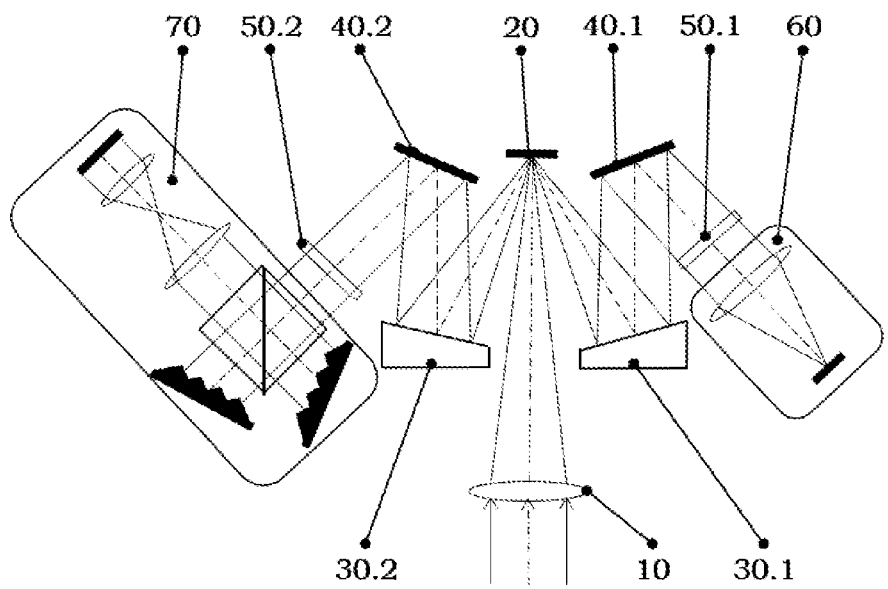
FIG. 1
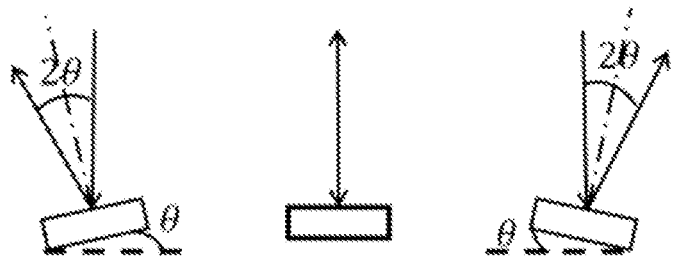
FIG. 2
FIG. 3A  FIG. 3B  FIG. 3C

WIDE-FIELD IMAGING AND HYPERSPECTRAL COLLABORATIVE EARLY WARNING SYSTEM AND METHOD

CROSS REFERENCE TO THE RELATED APPLICATIONS

This application is the national phase entry of International Application No. PCT/CN2022/103591, filed on Jul. 4, 2022, which is based upon and claims priority to Chinese Patent Application No. 202110856503.9, filed on Jul. 28, 2021, the entire contents of which are incorporated herein by reference.

TECHNICAL FIELD

The present invention relates to the technical field of remote sensing photoelectric detection and early warning, and in particular to a wide-field imaging and hyperspectral collaborative early warning system and method.

BACKGROUND

The wide-field imaging technology is generally applied to the field of remote or remote sensing detection for general survey. However, the traditional wide-field imaging technology has a high false alarm rate in the aspect of market general survey. Therefore, the wide-field imaging general survey and the hyperspectral accurate identification are combined to perform the collaborative early warning, however, the synchronization of the wide-field imaging general survey and the hyperspectral accurate identification is not achieved in the existing structure, and the defect of insufficient dynamic range of a hyperspectral interferometer is not solved.

Therefore, providing a wide-field imaging and hyperspectral collaborative early warning system and method to solve the problem that wide-field imaging general survey and hyperspectral accurate identification cannot be synchronized and to achieve early warning screening of characteristic targets in the field of remote or remote sensing detection such as vehicle-mounted, airborne and satellite-mounted detection is a problem required to be solved urgently by those skilled in the art.

SUMMARY

In view of this, the present invention provides a wide-field imaging and hyperspectral collaborative early warning system and method, wherein the corresponding characteristic target identification mechanism is simple to operate, and the accurate identification of the characteristic target under the conditions of different spatial resolutions and wide dynamic ranges can be achieved through the micro-control modulation of specific pixels by a wide-field-of-view camera.

In order to achieve the above objective, the present invention adopts the following technical solutions:

Provided is a wide-field imaging and hyperspectral collaborative early warning system, including:
a primary imaging system 10, a digital micromirror array 20, a first collimation system 30.1, a second collimation system 30.2, a first reflector 40.1, a second reflector 40.2, a wide-field imaging optical filter 50.1, a narrow-band optical filter 50.2, a wide-field imager 60 and a hyperspectral interferometer 70, wherein
the primary imaging system 10 and the digital micromirror array 20 are arranged in a direction perpendicular to an incident direction of a measured target; the first collimation system 30.1, the first reflector 40.1, the wide-field imaging optical filter 50.1 and the wide-field imager 60 are arranged on one side of a symmetry axis, the symmetry axis being the incidence direction of the measured target, and the second collimation system 30.2, the second reflector 40.2, the narrow-band optical filter 50.2 and the hyperspectral interferometer 70 are arranged on the other side of the symmetry axis.

Preferably, the digital micromirror array 20 has three flip states for incident light: 0 state, +1 state and −1 state, and specific contents are as follows:
0 state: incident light is reflected to the measured target through the digital micromirror array 20 in an original path;
+1 state: incident light is incident to the wide-field imager 60 through the collimation system 30.1, the reflector 40.1 and the wide-field imaging optical filter 50.1, so as to achieve wide-field imaging;
−1 state: incident light is incident to the hyperspectral interferometer 70 through the collimation system 30.2, the reflector 40.2 and the narrow-band optical filter 50.2 for fine spectrum identification.

Preferably, the digital micromirror array 20 includes m×n individually controlled elements, each of the elements having three flip states: 0 state, +1 state and −1 state.

Preferably, the digital micromirror array 20 includes target elements 20.1 and remaining elements 20.2.

Preferably, the wide-field imager 60 consists of a lens 60.1 arranged in a coaxial projection or off-axis reflection manner and a wide-field imager photosensitive component 60.2.

Preferably, the hyperspectral interferometer 70 consists of a beam splitter 70.1, an optical path difference modulation element 70.2, an interferometer imaging lens set 70.3 and an interferometer detector 70.4;
the beam splitter 70.1 projects incident light to the optical path difference modulation element 70.2 for modulation to generate interference fringes, and the interference fringes are imaged on the interferometer detector 70.4 according to a set scaling ratio through the interferometer imaging lens set 70.3.

Provided is a wide-field imaging and hyperspectral collaborative early warning method, including the following steps:
performing, by the wide-field imager 60, full-field-of-view wide-field general survey with all of the elements in the digital micromirror array 20 being in −1 state;
determining whether the measured target exists or not, if no, keeping the elements 20.2 in −1 state, and performing, by the wide-field imager 60, synchronous general survey; if yes, flipping the target elements 20.1 to +1 state, and performing, by the hyperspectral interferometer 70, multi-field-of-view fine spectrum identification, the field range of the hyperspectral interferometer 70 depends on the number of the target elements 20.1; and
determining whether the hyperspectral interferometer 70 has a spatial resolution requirement, if yes, increasing the number of the elements 20.2 in −1 state (general survey mode), and increasing the synchronous general survey by the wide-field imager 60; accordingly reducing the number of the elements 20.1 in +1 state (target mode), and performing, by the hyperspectral interferometer 70, fine spectrum identification with a spatial resolution; if no, keeping the number of the target elements 20.1 in +1 state unchanged, and performing, by the hyperspectral interferometer 70, multi-field-of-view fine spectrum identification.

According to the above technical solutions, compared with the prior art, the present invention provides a wide-field imaging and hyperspectral collaborative early warning system and method, which have the advantages that the wide-field imaging general survey and fine spectrum detection can be realized synchronously, the functions are multiple, and the false alarm rate is low; the target spatial resolution of the fine spectrum identification is adjustable, the micro-control unit flipping solution is simple to operate, and quick adjustment is realized; the adaptability is strong, the flipping time of the corresponding micro-control unit is adaptively adjusted for the measured target with too low or too strong radiation intensity, and the dynamic range of the hyperspectral interferometer and the wide-field imager is effectively improved.

BRIEF DESCRIPTION OF THE DRAWINGS

In order to more clearly illustrate the technical schemes in the examples of the present invention or in the prior art, the drawings required to be used in the description of the examples or the prior art are briefly introduced below. It is obvious that the drawings in the description below are merely examples of the present invention, and those of ordinary skilled in the art can obtain other drawings according to the drawings provided without creative efforts.

FIG. 1 is a structural layout diagram of a wide-field imaging and hyperspectral collaborative early warning system according to the present invention;

FIG. 2 is a constitution diagram of a real digital micromirror array according to the present invention;

FIGS. 3A-3C show a diagram showing three flip states of a single digital micromirror according to the present invention, wherein FIG. 3A is 0 state, FIG. 3B is +1 state, and FIG. 3C is −1 state;

DETAILED DESCRIPTION OF THE EMBODIMENTS

Figure 4:
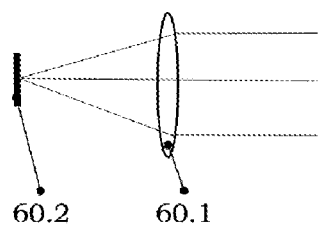
FIG. 4 is a schematic structural diagram of a wide-field imager according to the present invention.

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skilled in the art without creative efforts shall fall within the protection scope of the present invention.

Referring to FIG. 1, the present invention discloses a wide-field imaging and hyperspectral collaborative early warning system, which includes: a primary imaging system 10, a digital micromirror array 20, a first collimation system 30.1, a second collimation system 30.2, a first reflector 40.1, a second reflector 40.2, a wide-field imaging optical filter 50.1, a narrow-band optical filter 50.2, a wide-field imager 60 and a hyperspectral interferometer 70, wherein the primary imaging system 10 and the digital micromirror array 20 are arranged in a direction perpendicular to an incident direction of a measured target; the first collimation system 30.1, the first reflector 40.1, the wide-field imaging optical filter 50.1 and the wide-field imager 60 are arranged on one side of a symmetry axis, the symmetry axis being the incidence direction of the measured target, and the second collimation system 30.2, the second reflector 40.2, the narrow-band optical filter 50.2 and the hyperspectral interferometer 70 are arranged on the other side of the symmetry axis.

In a specific embodiment, referring to FIGS. 3A-3C, the digital micromirror array 20 has three flip states for incident light: 0 state, +1 state and −1 state, and specific contents are as follows:

0 state: incident light is reflected to the measured target through the digital micromirror array 20 in an original path;

+1 state: incident light is incident to the wide-field imager 60 through the collimation system 30.1, the reflector 40.1 and the wide-field imaging optical filter 50.1, so as to achieve wide-field imaging;

−1 state: incident light is incident to the hyperspectral interferometer 70 through the collimation system 30.2, the reflector 40.2 and the narrow-band optical filter 50.2 for fine spectrum identification.

In a specific embodiment, referring to FIGS. 2 and 3A-3C, the digital micromirror array 20 includes m×n individually controlled elements, each of the elements having three flip states: in FIGS. 3A-3C, FIG. 3A is 0 state, FIG. 3B is +1 state, and FIG. 3C is -1 state.

In a specific embodiment, referring to FIG. 2, the digital micromirror array 20 includes target elements 20.1 and remaining elements 20.2.

In a specific embodiment, the primary imaging system 10 may be a reflective imaging system or a transmissive objective lens system, with the primary imaging real image plane located at the digital micromirror array 20.

In a specific embodiment, referring to FIG. 4, the wide-field imager 60 consists of a lens 60.1 arranged in a coaxial projection or off-axis reflection manner and a wide-field imager photosensitive component 60.2.

The lens 60.1 may be a reflective imaging system or a transmissive imaging system, and the wide-field imager photosensitive component 60.2 is conjugated with the digital micromirror array 20 so as to achieve wide-field imaging and measured target general survey functions.

Figure 5:
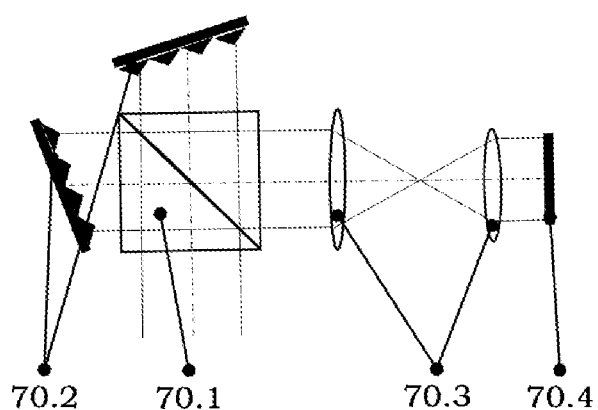
FIG. 5 is a schematic structural diagram of a hyperspectral interferometer according to the present invention.

In a specific embodiment, referring to FIG. 5, the hyperspectral interferometer 70 consists of a beam splitter 70.1, an optical path difference modulation element 70.2, an interferometer imaging lens set 70.3 and an interferometer detector 70.4, wherein the beam splitter 70.1 may be in the form of a beam splitter prism or in the form of a beam splitter plate and a compensator plate; the optical path modulation element 70.2 may be in the form of a two-arm field-of-view expanding prism and a grating, or a two-arm step reflector, or a single-arm reflector and a single-arm grating;

the beam splitter 70.1 projects incident light to the optical path difference modulation element 70.2 for modulation to generate interference fringes, and the interference fringes are imaged on the interferometer detector 70.4 according to a set scaling ratio through the interferometer imaging lens set 70.3.

In a specific embodiment, the first collimation system 30.1 and the second collimation systems 30.2 may be reflective coaxial collimation systems, reflective off-axis collimation systems, or transmissive collimation systems. The field-of-view range of the parallel light collimated by the first collimation system 30.1 meets the general survey requirement of the wide-field imager 60, and the field-of-view angle of the parallel light collimated by the second collimation system 30.2 meets the fine spectral characteristic identification requirement of the hyperspectral interferometer 70.

The first reflector 40.1 and the second reflector 40.2 deflect the parallel light emitted by the first collimation system 30.1 and the second collimation system 30.2 to the wide-field imager 60 and the hyperspectral interferometer 70, respectively, so that the overall size of the instrument can be effectively reduced. According to the requirement of the optical path layout, the number of the first reflector 40.1 and the second reflector 40.2 may be zero, or the number of the reflectors may be respectively increased prior to the optical paths of the wide-field imager 60 and the hyperspectral interferometer 70.

The wide-field imaging optical filter 50.1 meets the requirements of the wide-field imager 60 on the transmissive spectral range, the cut-off spectral range and the cut-off depth, and the narrow-band optical filter 50.2 meets the requirements of the hyperspectral interferometer 70 on the sampling magnification, the transmissive spectral range, the cut-off spectral range and the cut-off depth.

In a specific embodiment, according to the radiation intensity of a measured target, the corresponding pixels of the digital micromirror array adaptively adjust the flipping modulation time, so as to realize fine spectrum identification under the conditions of different spatial resolutions and wide dynamic range input.

Figure 6:
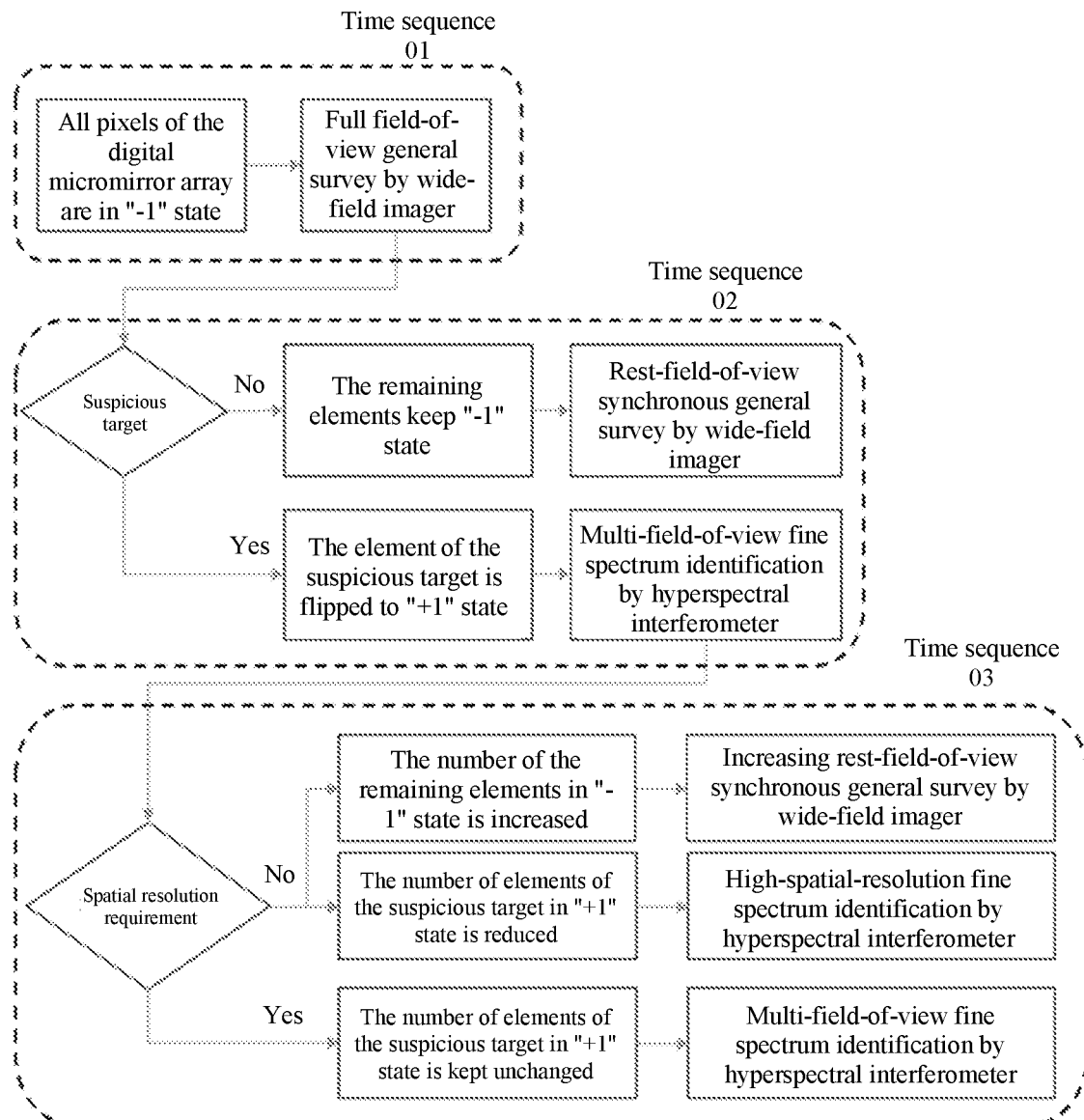
FIG. 6 is a time sequence diagram of a wide-field imaging and hyperspectral collaborative early warning method according to the present invention.

Referring to FIG. 6, the present invention discloses a wide-field imaging and hyperspectral collaborative early warning method, which includes the following steps:

performing, by the wide-field imager 60, full-field-of-view wide-field general survey with all of the elements in the digital micromirror array 20 being in −1 state;

determining whether the measured target exists or not, if no, keeping the remaining elements 20.2 in −1 state, and performing, by the wide-field imager 60, rest-field-of-view synchronous general survey; if yes, flipping the target elements 20.1 to +1 state, and performing, by the hyperspectral interferometer 70, multi-field-of-view fine spectrum identification; and determining whether the hyperspectral interferometer 70 has a spatial resolution requirement, if yes, increasing the number of the remaining elements 20.2 in −1 state, and increasing the rest-field-of-view synchronous general survey by the wide-field imager 60; or reducing the number of the target elements 20.1 in +1 state, and performing, by the hyperspectral interferometer 70, fine spectrum identification with a spatial resolution; if no, keeping the number of the target elements 20.1 in +1 state unchanged, and performing, by the hyperspectral interferometer 70, multi-field-of-view fine spectrum identification.

Figure 7:
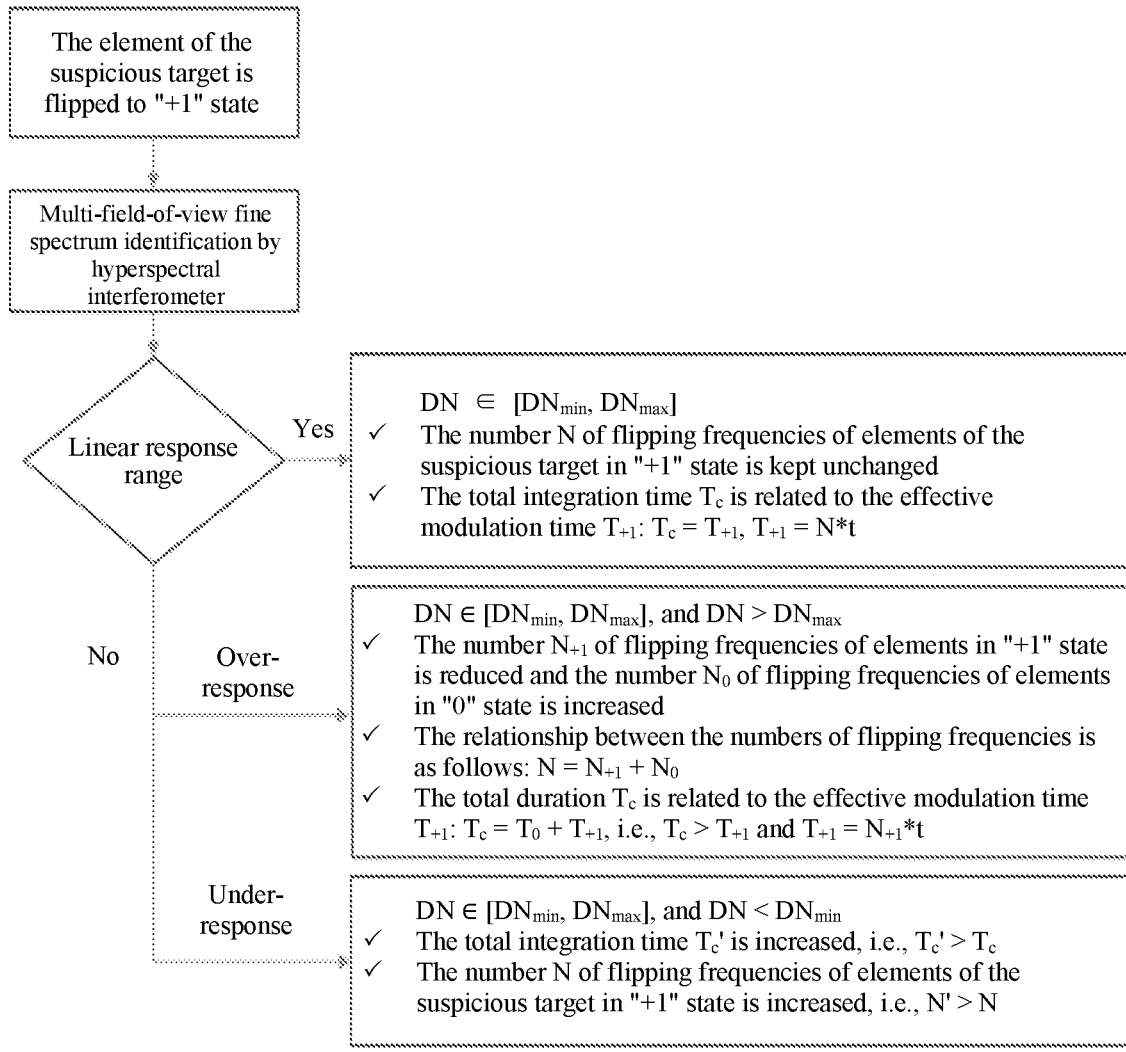
FIG. 7 is a flow chart of adaptively adjusting the flip modulation time according to the present invention.
Figure 8:
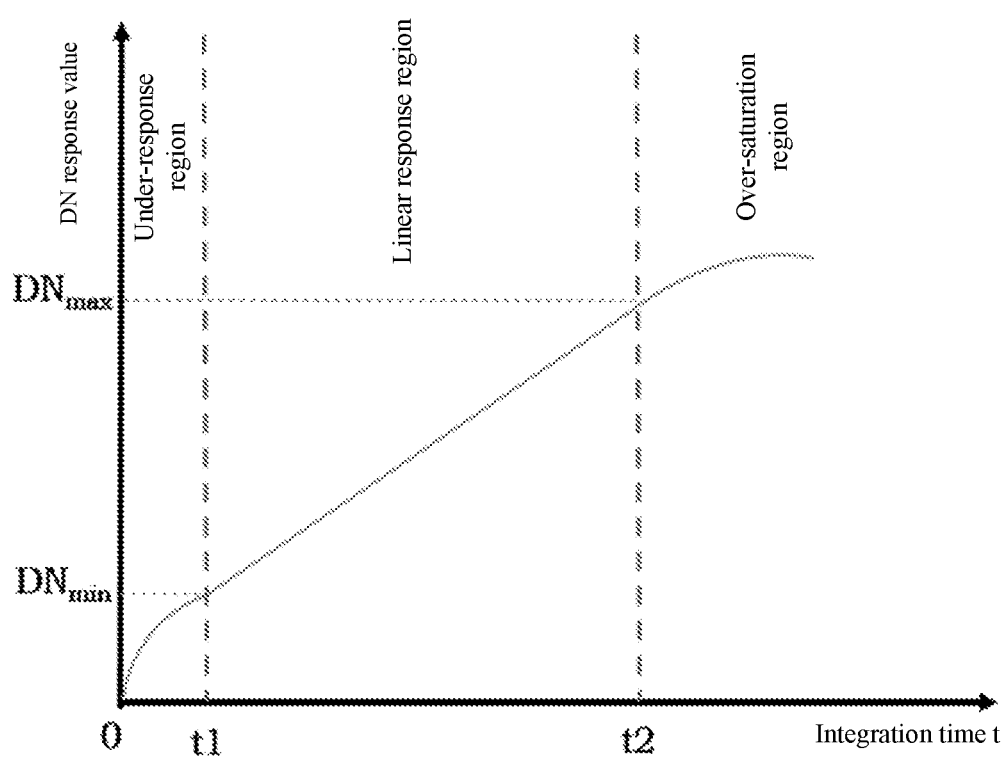
FIG. 8 is a typical response curve of a detector.

In a specific embodiment, referring to FIGS. 7 and 8, for the digital micromirror array 20, wherein each individual element of the target elements 20.1 may adaptively adjust the flipping frequency according to the response value of the interferometer detector 70.4:

when the radiation intensity of the measured target is in low under-response, namely $DN<DN_{min}$, the integration time $T_c$ of the hyperspectral interferometer may be increased, and the number of flipping frequencies N+1 of the target elements 20.1 in "+1" state is increased; when the radiation intensity of the measured target is in high over-saturation, namely $DN>DN_{max}$, the number of flipping frequencies N+1 of the target elements 20.1 in "+1" state is reduced, the number of flipping frequencies $N_0$ of the elements in "0" state is correspondingly increased, and $N=N_{+1}+N_0$, with $DN \in [DN_{min}, DN_{max}]$ being met under the condition that the integration time $T_c$ of the interferometer detector is unchanged.

As a result, the purpose of improving the detection dynamic range of the hyperspectral interferometer 70 is achieved.

Correspondingly, each individual element of the remaining elements 20.2 may adaptively adjust the flipping frequency according to the response value of the wide-field imager photosensitive component 60.2, wherein when the radiation intensity of the rest targets for general survey is low, namely in an under-response state, the number of flipping frequencies of the remaining elements 20.2 in "−1" state is increased; when the radiation intensity of the rest targets for general survey is high, namely in an over-response state, the number of flipping frequencies of other elements 20.2 in "−1" state is reduced, so that the dynamic range detected by the wide-field imager 60 is improved.

The above description of the disclosed embodiments is made in a progressive manner to enable those skilled in the art to implement or use the present invention. Various modifications to these embodiments will be readily apparent to those skilled in the art, and the generic principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A wide-field imaging and hyperspectral collaborative early warning system, comprising:

a primary imaging system, a digital micromirror array, a first collimation system, a second collimation system, a first reflector, a second reflector, a wide-field imaging optical filter, a narrow-band optical filter, a wide-field imager and a hyperspectral interferometer, wherein the primary imaging system and the digital micromirror array are arranged in a direction perpendicular to an incident direction of a measured target; the first collimation system, the first reflector-, the wide-field imaging optical filter and the wide-field imager are arranged on first side of a symmetry axis, the symmetry axis being an incidence direction of the measured target, and the second collimation system, the second reflector, the narrow-band optical filter and the hyperspectral interferometer are arranged on a second side of the symmetry axis, wherein the hyperspectral interferometer comprises a beam splitter, an optical path difference modulation element, an interferometer imaging lens set and an interferometer detector;

the beam splitter projects an incident light to the optical path difference modulation element for a modulation to generate interference fringes, and the interference fringes are imaged on the interferometer detector according to a set scaling ratio through the interferometer imaging lens set.

2. The wide-field imaging and hyperspectral collaborative early warning system according to claim 1, wherein
the digital micromirror array has three flip states for an incident light: 0 state, +1 state and −1 state, and specific contents are as follows:
0 state: the incident light is reflected to the measured target through the digital micromirror array in an original path;
+1 state: the incident light is incident to the wide-field imager through the first collimation system, the first reflector and the wide-field imaging optical filter, to achieve a wide-field imaging;
−1 state: the incident light is incident to the hyperspectral interferometer through the second collimation system, the second reflector and the narrow-band optical filter for a fine spectrum identification.

3. The wide-field imaging and hyperspectral collaborative early warning system according to claim 2, wherein
the digital micromirror array comprises m×n individually controlled elements, wherein each of the m×n individually controlled elements comprises three flip states: 0 state, +1 state and −1 state.

4. The wide-field imaging and hyperspectral collaborative early warning system according to claim 3, wherein
the digital micromirror array comprises target elements and remaining elements.

5. The wide-field imaging and hyperspectral collaborative early warning system according to claim 1, wherein
the wide-field imager comprises a lens and a wide-field imager photosensitive component, wherein the lens is arranged in a coaxial projection or off-axis reflection manner.

6. A wide-field imaging and hyperspectral collaborative early warning method, wherein the wide-field imaging and hyperspectral collaborative early warning system according to claim 1 is configured, and the wide-field imaging and hyperspectral collaborative early warning method comprises the following steps:
performing, by the wide-field imager, a full-field-of-view wide-field general survey with all of—elements in the digital micromirror array being in −1 state;
determining whether the measured target exists or not, if the measured target does not exist, keeping remaining elements in −1 state, and synchronously performing, by the wide-field imager, a rest-field-of-view general survey; if the measured target exists, flipping target elements to +1 state, and performing, by the hyperspectral interferometer, a multi-field-of-view fine spectrum identification; and
determining whether the hyperspectral interferometer has a spatial resolution requirement, if the hyperspectral interferometer has the spatial resolution requirement, increasing a number of the remaining elements in −1 state, and increasing the rest-field-of-view synchronous general survey by the wide-field imager; or reducing a number of the target elements in +1 state, and performing, by the hyperspectral interferometer, a fine spectrum identification with a spatial resolution; if the hyperspectral interferometer does not have the spatial resolution requirement, keeping the number of the target elements in +1 state unchanged, and performing, by the hyperspectral interferometer, the multi-field-of-view fine spectrum identification.

7. The wide-field imaging and hyperspectral collaborative early warning method according to claim 6, wherein in the wide-field imaging and hyperspectral collaborative early warning system, the digital micromirror array has three flip states for an incident light: 0 state, +1 state and −1 state, and specific contents are as follows:
0 state: the incident light is reflected to the measured target through the digital micromirror array in an original path;
+1 state: the incident light is incident to the wide-field imager through the first collimation system, the first reflector and the wide-field imaging optical filter, to achieve a wide-field imaging;
−1 state: the incident light is incident to the hyperspectral interferometer through the second collimation system, the second reflector and the narrow-band optical filter for a fine spectrum identification.

8. The wide-field imaging and hyperspectral collaborative early warning method according to claim 7, wherein in the wide-field imaging and hyperspectral collaborative early warning system, the digital micromirror array comprises m×n individually controlled elements, wherein each of the m×n individually controlled elements comprises three flip states: 0 state, +1 state and −1 state.

9. The wide-field imaging and hyperspectral collaborative early warning method according to claim 8, wherein in the wide-field imaging and hyperspectral collaborative early warning system, the digital micromirror array comprises target elements and remaining elements.

10. The wide-field imaging and hyperspectral collaborative early warning method according to claim 6, wherein in the wide-field imaging and hyperspectral collaborative early warning system, the wide-field imager comprises a lens and a wide-field imager photosensitive component, wherein the lens is arranged in a coaxial projection or off-axis reflection manner.

11. The wide-field imaging and hyperspectral collaborative early warning method according to claim 6, wherein in the wide-field imaging and hyperspectral collaborative early warning system, the hyperspectral interferometer comprises a beam splitter, an optical path difference modulation element, an interferometer imaging lens set and an interferometer detector;
the beam splitter projects an incident light to the optical path difference modulation element for a modulation to generate interference fringes, and the interference fringes are imaged on the interferometer detector according to a set scaling ratio through the interferometer imaging lens set.

* * * * *